(12) United States Patent
Krafzik et al.

(10) Patent No.: US 8,532,619 B2
(45) Date of Patent: Sep. 10, 2013

(54) SYSTEM FOR AUTHORIZING THE USE OF COMMUNICATION DEVICES BY PROXIMITY

(75) Inventors: Alexandre Bader Krafzik, Campinas (BR); Emerson Ricardo de Toledo, Campinas (BR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/981,629

(22) Filed: Dec. 30, 2010

(65) Prior Publication Data

US 2012/0171995 A1    Jul. 5, 2012

(51) Int. Cl.
*H04M 1/66*    (2006.01)

(52) U.S. Cl.
USPC ........... 455/411; 455/456; 455/558; 455/410; 455/557

(58) Field of Classification Search
USPC ................ 235/492, 411, 375, 380; 455/558, 455/456.2, 411, 410, 557, 41.2; 340/10.51, 340/539, 572, 10.2; 370/352
See application file for complete search history.

(56) References Cited

U.S. PATENT DOCUMENTS

| | | | | |
|---|---|---|---|---|
| 7,853,289 | B2 * | 12/2010 | Hong | 455/552.1 |
| 2005/0116050 | A1 * | 6/2005 | Jei et al. | 235/492 |
| 2005/0187677 | A1 * | 8/2005 | Walker | 701/16 |
| 2005/0216344 | A1 * | 9/2005 | Collet et al. | 705/14 |
| 2006/0208860 | A1 * | 9/2006 | Park et al. | 340/10.2 |
| 2007/0087834 | A1 * | 4/2007 | Moser et al. | 463/42 |
| 2008/0051142 | A1 * | 2/2008 | Calvet et al. | 455/558 |
| 2008/0099559 | A1 * | 5/2008 | Lo et al. | 235/441 |
| 2008/0126260 | A1 * | 5/2008 | Cox et al. | 705/67 |
| 2008/0306828 | A1 * | 12/2008 | Chao | 705/17 |
| 2009/0036165 | A1 * | 2/2009 | Brede | 455/558 |
| 2009/0215385 | A1 * | 8/2009 | Waters et al. | 455/1 |
| 2009/0256672 | A1 * | 10/2009 | Yamamoto et al. | 340/5.2 |
| 2009/0287589 | A1 * | 11/2009 | Fivel | 705/28 |
| 2010/0052868 | A1 * | 3/2010 | Lin | 340/10.51 |
| 2010/0052900 | A1 * | 3/2010 | Covannon et al. | 340/539.12 |
| 2010/0085160 | A1 * | 4/2010 | Fu | 340/10.1 |
| 2010/0090831 | A1 * | 4/2010 | Zhao et al. | 340/572.1 |
| 2010/0253521 | A1 * | 10/2010 | Williams, Sr. et al. | 340/572.1 |
| 2010/0279610 | A1 * | 11/2010 | Bjorhn et al. | 455/41.2 |
| 2010/0285771 | A1 * | 11/2010 | Peabody | 455/404.2 |
| 2010/0306531 | A1 * | 12/2010 | Nahari | 713/156 |
| 2010/0328049 | A1 * | 12/2010 | Frysz et al. | 340/10.51 |
| 2011/0029043 | A1 * | 2/2011 | Frysz et al. | 607/60 |
| 2011/0202466 | A1 * | 8/2011 | Carter | 705/67 |
| 2011/0281550 | A1 * | 11/2011 | Peabody | 455/404.2 |
| 2012/0205434 | A1 * | 8/2012 | Fang | 235/375 |

FOREIGN PATENT DOCUMENTS

| | | |
|---|---|---|
| EP | 1536573 | 6/2005 |
| WO | 2006137740 | 12/2006 |
| WO | 2009127159 | 10/2009 |

* cited by examiner

*Primary Examiner* — Joseph Arevalo

(57) ABSTRACT

The present invention relates to the use of a transponder for wireless communication with the mobile phone, replacing the process of inserting the SIM card inside the device.
The object of this patent is to provide a system that allows a plurality of communication devices, whether mobile, portable or fixed, with a second device which has as main feature the validation of user identity with the network of telecomunication providers. In this system, the device A comprises a SIM card that is activated when a device B is in a radius of less than 1 meter. The communication between two devices is done via radio frequency. Device B will make a periodic transmission of data within this radius to determine the continued presence of the device A. The device A containing the SIM card has a passive role, i.e., it only responds to requests from the device B, when receiving a transmission from the same.

10 Claims, 3 Drawing Sheets

SYSTEM FOR AUTHORIZING THE USE OF COMMUNICATION DEVICES BY PROXIMITY

FIELD OF THE INVENTION

The present invention patent relates to the area of telecommunications, in particular it refers to a system for validating user identity that allows the information contained in a SIM card (Subscriber Identity Module) to be sent via wireless technology to a portable or fixed communications device.

BACKGROUND OF THE INVENTION

The SIM card is a type of smart card used in digital GSM (Global System for Mobile Communications) cellular that stores user data and allows GSM mobile phones that are identified with mobile telephone network providers.

The devices that make use of mobile phone networks are now adapted to accommodate at least one SIM card. However, when they are sold, the SIM card, in general, is not included in them. The card must be purchased by the user in any of the providers. Once it is with the user, the SIM card must be inserted in the device so that they begin to provide all communication services related to the network.

The SIM cards currently available need to be included in the communication device, which presents the following disadvantages:

When a device with a SIM card is stolen or lost, all the information contained in the same is lost;

The user, in losing or forgetting the device somewhere, is not able to make use of his phone number or personal information such as contacts;

For a device to make use of more than one SIM card, it is necessary that it has two or more physical connectors to fit different cards. The manufacturing cost increases too much as such connectors are added;

when the battery of the device ends and the user wants to make use of a borrowed device, or the user uses the borrowed device, or it is necessary to open the devices to change the SIM cards;

While connected, the communication device literally holds the SIM card chip set, which increases battery consumption;

In case of prepaid phone numbers, recharging is done at ATMs of banks or supermarkets, and the user must enter the phone number openly, making it possible that this number is obtained by the bad people.

An RFID system consists basically of two parts:

A transceiver, also called "reader" that reads a signal and transfers the information to a device that will process it, and A transponder, which is commonly implemented as an RF tag (radio frequency), which should contain the information to be transmitted to the reader. Physically, a transponder has dimensions of only a few millimeters and the reader can maintain communication generally at distances less than 1 meter.

The patent document WO2006137740, published on Dec. 28, 2006, owner: TELENOR ASA, reveals a method and system for acquiring information related to a transponder (RFID tag) read by a mobile phone, comprising an RFID reader and an identification and authentication module (SIM card). When the RFID reader reads data from the RFID tag, the identifier and content data are processed and transmitted to a local network for further processing and distribution of supplementary information related to an RFID tag. The SIM card includes a WLAN transmitter and the transmission of the identifier is via the WLAN. According to the teachings of that document, the transponder is on the phone, the SIM card and the transponder are in the device B, which contained information "written" in the transponder transmitted to the SIM card.

The International application WO2009127159, published on Oct. 22, 2009, owner: QUANRAY ELECTRONICS SHANGHAI, describes a dual-interface SIM card and a radio frequency identification system using the same, in which the radio frequency identification system comprises at least a reader and a signal booster. The signal booster is used to relay signals and enhance between the dual interface SIM card and reader, and reader is employed to send command signals to the dual interface SIM card and receive a reply from the dual interface SIM card by the signal booster. The dual interface SIM card and the radio frequency identification system successfully apply a mobile communication equipment to an RFID system, thus making contactless radio frequency, short-distance, low cost identification. According to the teachings of said document, the SIM card is on the phone and the reader communicates with the SIM card.

The document European Patent EP1536573, published on Jun. 1, 2005, owner: SAMSUNG ELECTRONICS CO LTD, disclosures a mobile terminal having a smart card (SIM Card), coupled to an RFID tag and method for performing RFID function in this terminal. It is disclosed a mobile terminal equipped with a smart card coupled with RFID tag and a method for performing RFID function in a mobile terminal. The smart card includes a user information processing section for storing of user information and generating a signal of user information, including user information, an information processing section for storing RFID data and generation of a RFID sign, including RFID data and a main calculating section connected to the processing of user information section in order to control generation and transmission of an user information signal and connected to the RFID information processing section in order to command a generation and a transmission of the RFID signal. When the RFID tag detects an approach of an RFID interrogator, the RFID tag of a CPU requests the smart card to play the role of RFID. Thus, the CPU of the smart card transmits a transition signal so that a processor of the mobile terminal indicates a transition mode in an RFID mode. Then, the RFID function is performed. According to the teachings of said document, the transponder is on the phone, that is, the SIM card and the transponder is in the device B. Thus, when the device with the reader is near the phone, the smart phone becomes an intelligent transponder, since it has all the processing power of the phone with it. It is also described that the mobile phone operates in two modes: phone mode or transponder mode.

SUMMARY OF THE INVENTION

The present invention relates to the use of a transponder for wireless communication with the mobile phone, replacing the process of inserting the SIM card inside the device.

The object of this patent is to provide a system that allows a plurality of communication devices, whether mobile, portable or fixed, with a second device which has as main feature the validation of user identity with the network of telecomunication providers. In this system, the device A comprises a SIM card that is activated when a device B is in a radius of less than 1 meter. The communication between two devices is done via radio frequency. Device B will make a periodic transmission of data within this radius to determine the continued presence of the device A. The device A containing the SIM card has a passive role, i.e., it only responds to requests from the device B, when receiving a transmission from the same.

ADVANTAGES OF THE INVENTION

Based on the difficulties described in the current state of the art, the following advantages of the system of authorizing the use of communication devices by proximity of the present invention can be enumerated:

- Recording the use of more than one SIM card, or more than one phone number without the need to add more physical connectors to the device. With this feature, we may have devices that make use of two, three or more lines without increasing the manufacturing cost of the hardware. This is due to the fact that a single antenna and RF-ID driver can communicate with multiple transponders;
- As there is no card in the phone, and considering that the communication between the device and SIM card occurs at regular spaced periods, a lower power consumption will be required, no matter how many cards are registered for use with the device;
- There is the possibility of creating a new market of accessories based on the possibility that the SIM card can be inserted into a portable object for personal use, for example, a bracelet, watch, earring, ring, brooch or wallet;
- The bank transactions connected to the telephony providers no longer need to depend on the physical presence of a mobile phone. Only the presence of the SIM card is enough for authenticating a user and performing a payment transaction;
- buying new credits for a number of prepaid phone can be made through an ATM machine that communicates with the card, taking into account encryption factors already present in the cards of current technology, which allows the expansion of security and privacy in such transactions;
- Transactions made in stores and service centers of the telephony providers are simplified by the use of any equipment or computer with the RFID technology to communicate with the SIM card. It would not it be necessary that the technician uses the user phone to make changes to the plan.

BRIEF DESCRIPTION OF FIGURES

The objectives and advantages of the present invention will become more apparent from the following detailed description of an exemplary embodiment of the invention and attached drawings by way of non-limiting example, in which.

DETAILED DESCRIPTION OF THE INVENTION

Figure 1:
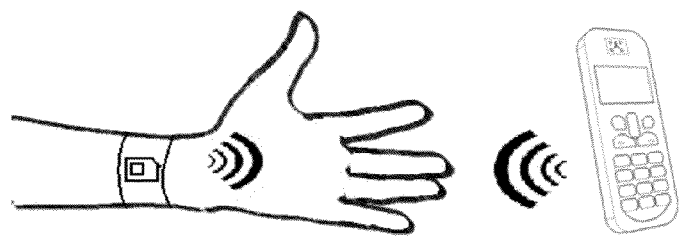
FIG. 1 shows an example of using the present invention, according to the preferred embodiment of the invention.

According to FIG. 1, an example of using the system is presented. A user places an accessory on his body (watch, bracelet, earring etc.) with a SIM card and transponder, i.e., the device A. When the user comes close to a device B (mobile phone without a SIM card), the phone starts working "as a mobile phone."

Figure 2:
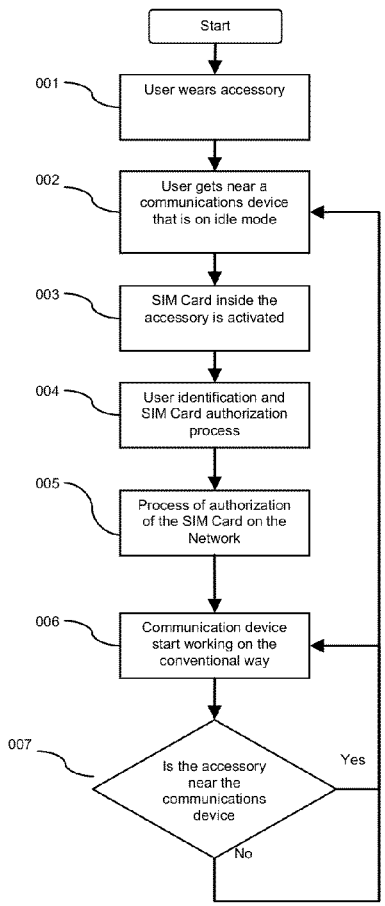
FIG. 2 shows the scheme of using the system of authorizing the use of communication devices by proximity according to the preferred embodiment of the present invention.

In FIG. 2, we present a commonly used scheme of the system of the present invention.

In 001, the user places the attachment on his body, for example, a clock having the transponder.

In 002, the user approaches his hand to the mobile phone, which is in standby mode, but searches an accessory at each time interval.

In 003, the accessory has been detected near the mobile phone and via radio frequency waves activate the card inside the accessory.

In 004, the card sends its information to the mobile phone that prompts the user for confirmation of connection, and at this moment, it can remember, and authorize the card. Thus, in a next iteration, this procedure takes place automatically.

In 005, the mobile phone register in the mobile network just like the traditional use of the SIM card.

In 006, the mobile device enters the normal operating mode, being able to make and receive calls.

In 007, at each time interval, the mobile phone makes a search for the accessory. If connection is available, the normal operation continues. If there is no connection, a new search for a new accessory is started.

Figure 3:
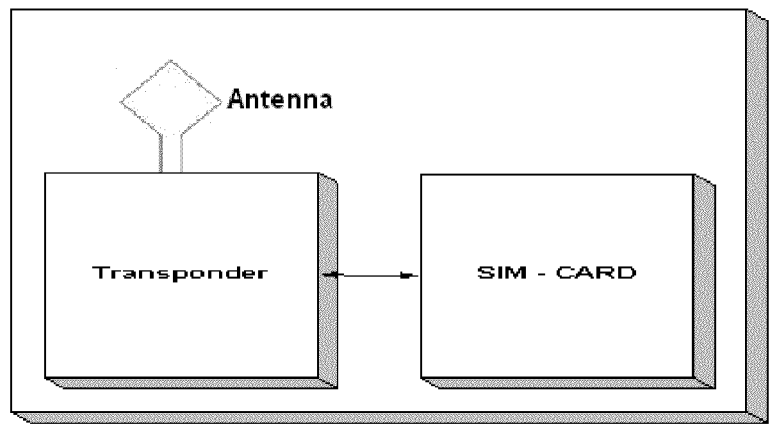
FIG. 3 shows an accessory containing the SIM card with the transponder, according to the preferred embodiment of the present invention.

As illustrated in FIG. 3, the system of authorizing the use of communication devices by proximity has two parts:

- The accessory containing the SIM card with the transponder. This accessory is a passive device that is activated when it gets close to a second device seeking to access the telephony network, and
- A communication device, e.g., a mobile phone that has no SIM card, but is configured to search for an "accessory" that has a SIM card+transponder, in which it may authorize the use of telephony network resources.

Figure 4:
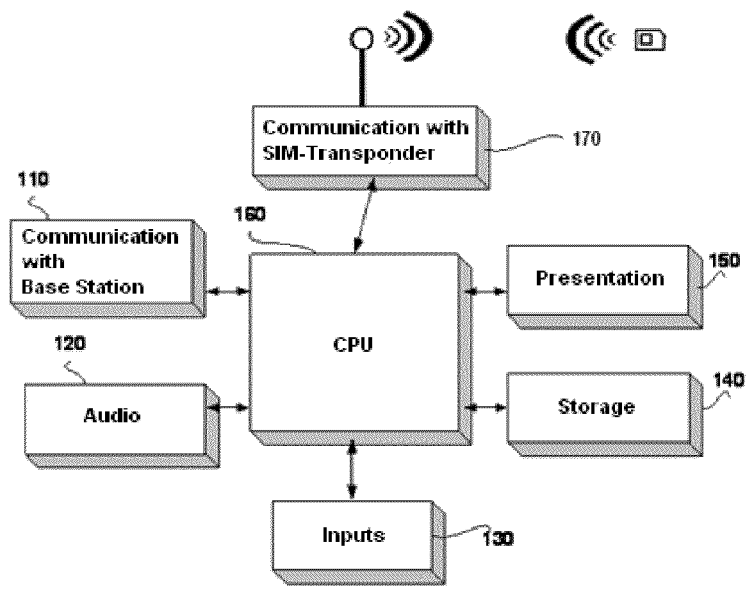
FIG. 4 shows the communication device, according to the preferred embodiment of the present invention.

As shown in FIG. 4, according to the preferred embodiment of the invention, the communication device has the following main components:

- RF communication circuit of the mobile phone with the network 110;
- audio reception and transmission circuit of the mobile phone 120;
- keyboard data entry, USB connectors, etc. 130;
- Memory for storage of user data 140;
- interface Circuit with the user, LCD screens, etc. 150;
- Main processing circuitry of the mobile phone 160, and
- RF communication circuit (Reader) between mobile phone and transponder 170.

Mobile Phone and SIM Card-Transponder

In the specific case of a mobile phone, the behavior of the same will not differ from the known behavior of the devices when they are with or without a SIM card connected. The difference is that instead of the card having to be physically inserted into the device, it should be at a maximum distance "x" of the device.

When the device is without a SIM card registered, it will have the already known behavior of the devices when they are without the card. That is, the phone's internal resources, applications, GPS, camera, etc. can be used, but only emergency calls can be made through the network of a provider. Also it will not be possible to have access to network messages (SMS/MMS), or to data traffic.

The accessory having the SIM card–transponder is initially set to be a passive device, i.e., it only actives and responds to a communication originated from the mobile phone when receiving a radio frequency message from the same. This is due to the fact that the radio signal from a device attempting to communicate with the accessory is the means that will provide electromagnetic energy so that the energy storage of the accessory receive sufficient electrical charge so that it can process and respond to such message. Because of this, proximity is necessary within the maximum range set by the RF-ID technology.

The accessory having the SIM card-transponder can be implemented as a bracelet, earring, ring or watch. In these cases, it is possible to think that there is a battery that can power the SIM card without the need to rely solely on the proximity of the mobile phone. This would increase the limit of the radius of action of the technology and the processing amount and quality regarding the communication with the devices.

Flow of Communication Between the SIM Card and Device

Figure 5:
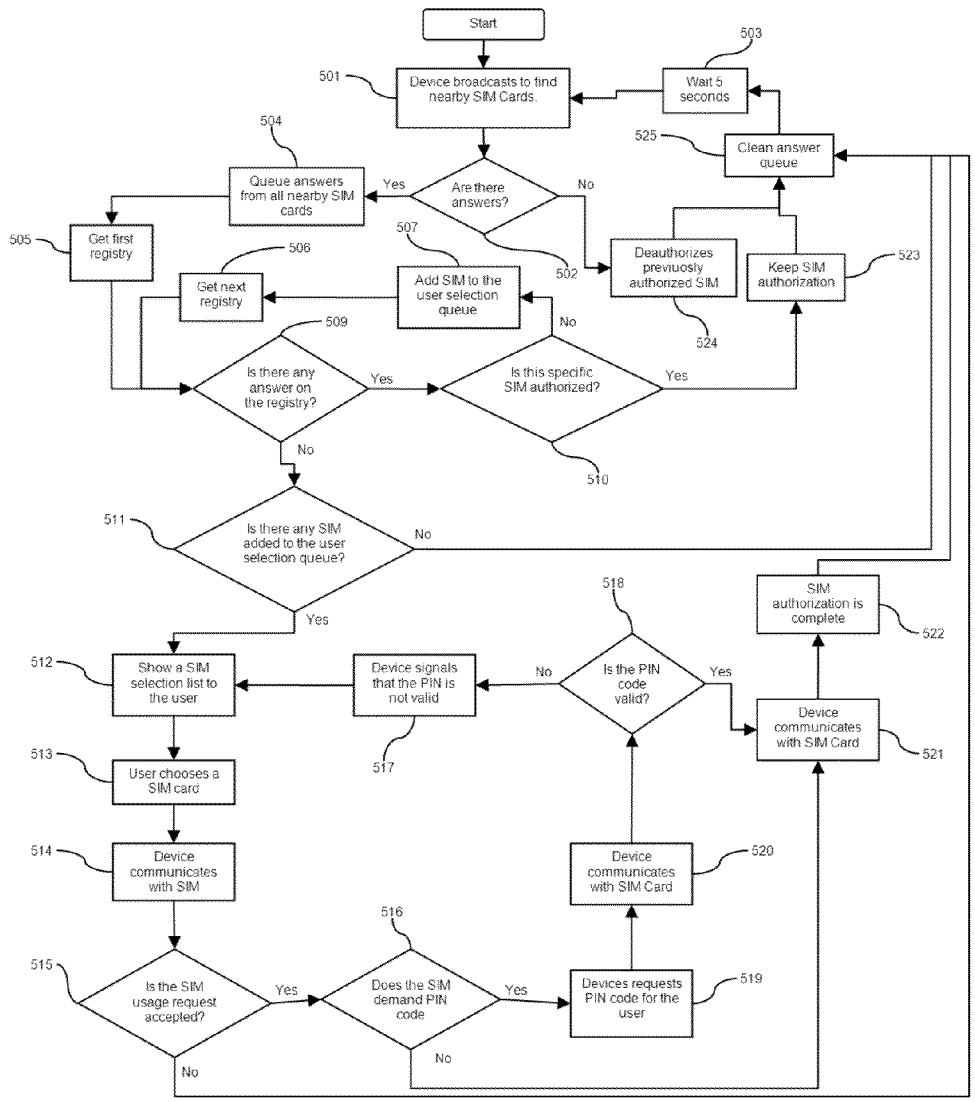
FIG. 5 shows the flow of communication between the SIM card and the device according to the preferred embodiment of the present invention.

FIG. 5 shows the flow of communication between the SIM card and the device according to the preferred embodiment of the present invention.

At 501, the device sends an open message to identify all possible SIM cards within the radius of one meter away.

At 502, the device queries the RFID communication queue to see if there were answers. If so, in 504, the device stores all the answers in a queue for processing. If not, in 524, the device disable any SIM that was previously allowed due to the fact that this is no longer within the radius of action stated.

At 503, the device awaits five seconds since the last transmission in order to run the next open transmission described in 501.

At 505, the first response from the communication processing queue is read and analyzed.

At 506, the next record of the communication processing queue is read and analyzed.

In 509, it is checked whether the reading performed at 505 and 506 returned an answer of the communication device with possible SIM cards within the present range of physical communication. If so, at 510, it is checked if the message being analyzed is a SIM card that has been previously authorized. And if not at 509, we move to 511, in which it is checked if there are items filled out in the select list of SIM cards for the user.

At 510, if the message in question from a SIM card is authorized in advance, we move to 523, in which the record of authorization of the card in question is updated, thus maintaining the same valid for use on the device at the current time. If the message is from a SIM card that was not previously authorized, at 507, it is added the identification of the card in question in the selection list for the user.

At 525, the communication response queue for the nearby SIM cards is deleted and processing is sent to 503, so that the necessary range is awaited before the next communication.

At 511, if there are identifiers of SIM cards filled out in the selection list for the user, the flow is turned to 512, in which the list of cards available in the vicinity is displayed to the user. In case there is no cards available, the communication queue is erased at 525.

At 513 the user is expected to make a selection from a SIM card to be used by the device.

At 514, the device sends a message addressed to the SIM card selected by the user to ask whether it can be used and what prerequisites are required.

At 515, the device analyzes the response of the SIM card. If the same state that it can be used at 516, a second analysis is made in the response in order to identify whether it requires the user to enter a PIN (Personal Identification Number). In case of an analysis of the response 515 indicates that the card cannot be used at 525, the response queue is cleared and the process restarted.

At 516, if there is the need to enter PIN code by the user, at 519, a message requiring such a code is displayed by the device. If there is no such need and the card can be used directly, at 521, communication is made with the card to effect the registration of use of the same.

After the user enters the PIN at 519, at 520, the device communicates with the SIM card in order to validate the code entered.

At 518, it is checked if the answer for PIN code validation is positive. In this case, at 521, a communication is made with the card to effect the registration of use of the same. If the code entered is rejected, the device warns the user, at 517, that the code is invalid and goes to 512, in which the select list of SIM cards is displayed again.

At 522, followed by implementation at 521, the registration card as authorized device is made and begins to use the information of the card in question to make its registration with the provider communication network.

It is important to note that it is not necessary to restrict the use of the present invention only to mobile phones that has SIM card. Public telephones and other communication devices and other devices connected to a network or Internet as laptop computers, netbooks and video-game are also within the scope of the present invention.

Although a preferred embodiment of the present invention is shown and described, those skilled in the technical will understand that various modifications can be made without departing from the spirit and scope of the present invention, as defined in the appended claims.

It is also expressly stated that all combinations of elements that perform the same function in substantially the same way to achieve the same results are within the scope of the present invention.

The invention claimed is:

1. A system for authorizing use of devices by proximity communication, the system comprising:
   a first device, comprising a SIM card and transponder, as an accessory adapted to be worn by a user; and
   a second device, without a SIM card, in standby mode seeking the first device at an interval;
   wherein when the first device is detected near the second device via radio frequency waves, the SIM card inside the first device is activated,
   the first device sends its information to the second device which asks the user to confirm a connection, and stores and authorizes the SIM card, and
   the second device registers on the mobile network as a SIM card which enables the phone to make and receive calls;
   wherein the second device queries for the SIM card through the radio frequency waves; and
   when the SIM card is found, the second device stores all responses in a processing queue;
   the second device checks a record of the processing queue;
   when the SIM card is in the record, the second device checks whether the SIM card was authorized in advance;
   when the SIM card is not in the record, the SIM card is added to the user's section queue;
   when the SIM card was not previously authorized, the second device disables the SIM card and it is no longer within the radius of action.

2. The system for authorizing use of devices by proximity communication, as in claim 1, wherein, in a subsequent registration, the registration procedure in the mobile network takes place automatically.

3. The system for authorizing use of devices by proximity communication, as in claim 1, wherein, at each interval, the mobile phone makes a search for the first device;
   if there is connection, the mode normal operation continues;
   otherwise, a new search for a new accessory is started.

4. The system for authorizing use of devices by proximity communication, as in claim 1, wherein the device containing the SIM card and the transponder is set to be a passive device that only activates and answers communications that originate from the second device upon receiving a radio frequency message from the same.

5. The system for authorizing use of devices by proximity communication, as in claim 1, wherein the radio signal from the second device that is trying to communicate with the first device provides electromagnetic energy, such that an energy storage of the second device receives an electrical charge to process and respond to the message.

6. The system for authorizing use of devices by proximity communication, as in claim 5, wherein the proximity between the first and second devices must be within the maximum range set by the RF-ID technology.

7. The system for authorizing use of devices by proximity communication, as in claim 1, wherein the first device containing the SIM card–transponder can be implemented as a bracelet, earring, ring, or watch.

8. The system for authorizing use of devices by proximity communication, as in claim 1, wherein there is a battery that powers the SIM card without the need to rely on the proximity of the second device only.

9. The system for authorizing use of devices by proximity communication, as in claim 1, wherein the second device sends an open message to identify all possible SIM cards within the radius of one meter away.

10. The system for authorizing use of devices by proximity communication, as in claim 1, wherein the second device waits for five seconds after the last transmission before running the next transmission.

* * * * *